US010983232B2

(12) United States Patent
Ba et al.

(10) Patent No.: US 10,983,232 B2
(45) Date of Patent: Apr. 20, 2021

(54) SEISMIC ROCK PHYSICS INVERSION METHOD BASED ON LARGE AREA TIGHT RESERVOIR

(71) Applicant: HOHAI UNIVERSITY, Jiangsu (CN)

(72) Inventors: Jing Ba, Jiangsu (CN); Wenhui Tan, Jiangsu (CN); Wei Qian, Jiangsu (CN); Wei Cheng, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 0 days.

(21) Appl. No.: 16/317,822

(22) PCT Filed: Jul. 11, 2017

(86) PCT No.: PCT/CN2017/092445
§ 371 (c)(1),
(2) Date: Jan. 14, 2019

(87) PCT Pub. No.: WO2018/010628
PCT Pub. Date: Jan. 18, 2018

(65) Prior Publication Data
US 2020/0132869 A1    Apr. 30, 2020

(30) Foreign Application Priority Data
Jul. 15, 2016  (CN) .......................... 201610563338.7

(51) Int. Cl.
*G01V 1/28* (2006.01)
*G01V 1/30* (2006.01)

(52) U.S. Cl.
CPC .............. *G01V 1/282* (2013.01); *G01V 1/306* (2013.01); *G01V 2210/6169* (2013.01)

(58) Field of Classification Search
CPC . G01V 1/282; G01V 1/306; G01V 2210/6169
(Continued)

(56) References Cited

U.S. PATENT DOCUMENTS

2004/0230389 A1    11/2004    Adler et al.

FOREIGN PATENT DOCUMENTS

| CN | 102749643 | 10/2012 |
| CN | 102854531 | 1/2013 |

(Continued)

OTHER PUBLICATIONS

Spikes, Rock physics model-based seismic inversion (Year: 2006).*
(Continued)

*Primary Examiner* — Michael P Nghiem
*Assistant Examiner* — Dacthang P Ngo
(74) *Attorney, Agent, or Firm* — JCIPRNET

(57) ABSTRACT

A seismic rock physics inversion method based on a large area tight reservoir includes steps: building a multi-scale rock physics model; analyzing fluid sensitivities of rock physics parameters in two scales of acoustic logging and ultrasonic wave, and sifting the rock physics parameters that are most sensitive to a porosity and a gas saturation in a plurality of observation scales; building a single-well rock physics template, preferably a standard template; considering lateral variations and heterogeneity of reservoir geological features, fine-tuning input parameters of the rock physics template according to gas testing situations of all wells in a large work area, optimizing the whole work area and building a three-dimensional work area rock physics template data volume, and combining the data volume with pre-stack seismic inversion to calculate a porosity and a saturation of a target layer; and smoothing a result and finally outputting a reservoir parameter inversion data volume.

8 Claims, 10 Drawing Sheets

(58) Field of Classification Search
USPC .......................................................... 702/14
See application file for complete search history.

(56) References Cited

FOREIGN PATENT DOCUMENTS

| CN | 103163553 | 6/2013 |
|---|---|---|
| CN | 103645516 | 3/2014 |
| CN | 103760081 | 4/2014 |
| CN | 103984010 | 8/2014 |
| CN | 106054248 | 10/2016 |

OTHER PUBLICATIONS

Zhao, Rock Physics based on probabilistic lithology and fluid prediction in a heterogeneous carbonate (Year: 2013).*

Tang, Jianwei, "Discussion on several issues about seismic rock physics", Geophysical Prospecting for Petrolem, Jul. 2008, pp. 398-404, and 2008.

F. Gassmann, "On elasticity of porous media", Vierteljahrsschrift der naturforschenden Gesellschaft in Zürich, Mar. 31, 1951, pp. 1-23.

M. A. Biot, "Theory of Propagation of Elastic Waves in a Fluid-Saturated Porous Solid. I. Low-Frequency Range", Reprinted from The Journal of the Acoustical Society of America, Mar. 1956, pp. 168-178.

M. A. Biot, "Mechanics of Deformation and Acoustic Propagation in Porous Media", Journal of Applied Physics, Apr. 1962, pp. 1482-1498.

Mavko et al., "Melt Squirt in the Asthenosphere", Journal of Geophysical Research, Apr. 10, 1975, pp. 1444-1448.

Dvorkin et al., "Dynamic poroelasticity: A unified model with the squirt and the Biot mechanisms", Geophysics, Apr. 1993, pp. 524-533.

Gurevich et al., "A simple model for squirt-flow dispersion and attenuation in fluid-saturated granular rocks", Geophysics, Dec. 8, 2010, pp. N109-N120.

Vinci et al., "On attenuation of seismic waves associated with flow in fractures", Geophysical Research Letters, Oct. 16, 2014, pp. 1-9.

Papageorgiou et al., "Multifluid squirt flow and hysteresis effects on the bulk modulus-water saturation relationship", Geophysical Journal International, Sep. 2015, pp. 814-817.

J. E. White, "Computed Seismic Speeds and Attenuation in Rocks With Partial Gas Saturation", Geophysics, Apr. 1975, pp. 224-232.

Steven R. Pride, "Linear dynamics of double-porosity dual-permeability materials. I. Governing equations and acoustic attenuation", Physical Review, Sep. 2003, pp. 036603-1-036603-10.

Ba et al., "Biot-Rayleigh theory of wave propagation in double-porosity media", Journal of Geophysical Research, Jun. 8, 2011, pp. 1-12.

Ba et al., "Velocity dispersion and attenuation of P waves in partially-saturated rocks: Wave propagation equations in double-porosity medium", Chinese Journal of Geophysics, Jan. 2012, pp. 219-231.

Sun et al., "Comparison of P-wave attenuation models of wave-induced flow", Geophysical Prospecting, Nov. 2014, pp. 1-13.

"International Search Report (Form PCT/ISA/210)", dated Oct. 16, 2017, with English translation thereof, pp. 1-6.

* cited by examiner

SEISMIC ROCK PHYSICS INVERSION METHOD BASED ON LARGE AREA TIGHT RESERVOIR

CROSS-REFERENCE TO RELATED APPLICATION

This application is a 371 application of an international PCT application serial no. PCT/CN2017/092445, filed on Jul. 11, 2017, which claims priority to and the benefit of China Patent Application No. CN201610563338.7, filed on Jul. 15, 2016. The entirety of each of the above-mentioned patent applications is hereby incorporated by reference herein and made a part of this specification.

FIELD OF THE INVENTION

The present invention belongs to the field of seismic rock physics inversion technologies, and in particular, to a seismic rock physics inversion method based on a large area tight reservoir.

DESCRIPTION OF RELATED ART

Currently, using seismic data to directly predict a reservoir and recognize hydrocarbon features has been developed into a research hotspot in the field of exploration geophysics, but its research difficulty is that the seismic data is a comprehensive reflection of properties of an underground reservoir in multiple aspects. Under-determining of an inverse problem results in multiplicity in seismic interpretation and seismic prediction. Seismic rock physics, as a bridge communicating aboveground seismic data and underground reservoir parameters, is a theoretical and experimental basis of quantitative interpretation on a hydrocarbon-containing reservoir. Seismic inversion driven by rock physics helps to accurately recognize hydrocarbon features and distribution laws of an underground reservoir, so as to deal with multiplicity and limitations of a seismic inversion problem. In the study of rock physics, quantitative relationships between a rock elastic parameter and each of a reservoir physical property and a pore fluid parameter may be built to expand the conventional rock physical experimental study from a rock core scale to an oil field scale, and rock physics models in different observation scales (a rock core scale, a logging scale, and a seismic scale) are built to implement fusion between multidisciplinary data in different scales (Tang, 2008). With regard to three observation scales of seismic, logging, and ultrasonic wave experiments, currently, most geophysical scholars interpret differences among observation results in different scales by using a wave velocity dispersion mechanism induced by a pore fluid flow mechanism. Three types of pore fluid flow mechanisms are respectively: a macroscopic-scale pore fluid flow mechanism (Gassmann, 1951; Biot, 1956, 1962), a grain-scale pore fluid flow mechanism (Mavko, 1975; Dvorkin, 1993; Gurevich et al., 2010; Vinci et al., 2014; Papageorgiou et al., 2015), and a mesoscopic-scale (larger than a pore size, but far less than a wavelength) fluid flow mechanism (White, 1975; Pride, 2003; Ba et al., 2011, 2012; Sun et al., 2014). Since a carbonatite reservoir has complex pore structures and strong lateral heterogeneity, a conventional rock physics template built based on a single pore structure and single-scale data is inapplicable to a large work area.

Chinese patent 201210335739.9 discloses "a multi-scale rock physics template method and device for detecting reservoir hydrocarbon". The method includes: obtaining a reservoir rock matrix model and a reservoir rock skeleton model, obtaining a fluid-containing rock model according to the reservoir rock matrix model, the reservoir rock skeleton model, and fluid parameters, and obtaining a multi-scale initial reservoir rock physics template according to the fluid-containing rock model; correcting the initial reservoir rock physics template under a plurality of frequency bands according to rock physical experimental data; correcting the initial reservoir rock physics template under an acoustic logging frequency band according to a logging interpretation result; and outputting a final reservoir rock physics template after the correction, so as to carry out inversion of reservoir rock physics parameters. This method can increase precision of the rock physics template and implement the quantitative inversion of rock parameters and a saturation of a fluid. However, in this method, modeling is performed by taking a pore structure of a single type in combination with multi-scale wave data into consideration, and an obvious disadvantage thereof is inapplicable to a heterogeneous reservoir whose formation pore structure type changes.

Chinese patent 201310752436.1 discloses "a gas reservoir prediction method and system of a carbonatite reservoir based on pore structure features". The method includes: collecting a rock sample of a target layer section of the carbonatite reservoir; authenticating geological thin sheets of the rock sample so as to obtain rock basic parameters, including rock constituents, a pore shape, a surface porosity, and a sedimentary phase belt; carrying out pore permeation measurement on the rock sample so as to obtain pore permeation basic parameters including a porosity, a permeability, and a density; constructing a dry rock skeleton model according to the rock basic parameters, the pore permeation basic parameters, and a differential effective medium model; carrying out fluid substitution according to the dry rock skeleton model, so as to generate a rock physics template; obtaining pre-stack seismic inversion data of the carbonatite reservoir; and intersecting the pre-stack seismic inversion data with the rock physics template, to obtain prediction results of a porosity and a gas saturation of the carbonatite reservoir. Accurate quantitative gas reservoir prediction is implemented. In this method, compared with patent 201210335739.9, a lateral heterogeneity change feature of a pore structure is properly considered, and features of two types of structures, namely, a pore-type structure and a fracture-type structure, are separately analyzed. This method is applicable to inversion application of a small work area, but is inapplicable to technical requirements in a large work area where lateral variations of geological features are intense and combined inversion of reservoir parameters of a plurality of wells is performed due to the following reasons: first, no work area standard template is built by combining multi-well data, to describe general features of a formation, and perform fine-tuning at each coordinate locations in the work area; second, a three-dimensional work area template data volume cannot be manufactured, a structure is qualitatively divided merely according to a small quantity of reference wells, so that precision of description on heterogeneity is relatively low; and third, before reservoir hydrocarbon prediction, fluid sensitivity analysis is not performed on multi-scale data.

In conclusion, how to overcome disadvantages in the prior art is one of the important issues that need to be resolved urgently in the field of seismic rock physics inversion technologies.

SUMMARY OF THE INVENTION

Technical Problem

An objective of the present invention is to overcome disadvantages in the prior art to provide a seismic rock physics inversion method based on a large area tight reservoir. The present invention can effectively improve precision of hydrocarbon seismic prediction by effectively using multi-well data and multi-scale waveform response data and implement quantitative prediction on a reservoir by combining a rock physics model with pre-stack seismic data inversion.

Technical Solution

According to the present invention, a seismic rock physics inversion method based on a large area tight reservoir is provided, including the following specific steps.

Step 101: predicting a wave response dispersion based on a poroelasticity theory, building a multi-scale rock physics model, to associate with multi-scale data, where the building a multi-scale rock physics model is based on impact exerted by mineral constituents, a pore structure, and a formation environment of a rock on a wave response feature of the rock, and determining that reservoir environmental factors include a temperature and a pressure, reservoir lithological factors include mineral components, a pore shape, a shale content, and a pore structure, and reservoir fluid factors include a fluid viscosity and a gas-water patchy saturation.

Step 102: analyzing and correcting a logging interpretation result based on the model and gas testing situations of some wells, analyzing fluid sensitivities of rock physics parameters in two scales of acoustic logging and ultrasonic wave, and sifting the rock physics parameters which are most sensitive to a porosity and a gas saturation in a plurality of observation scales, where the rock physics parameters in the two scales of acoustic logging and ultrasonic wave are elastic parameters and a combination of the elastic parameters, and the elastic parameters at least include the following physical quantities: a P-wave velocity Vp, a S-wave velocity Vs, a P-wave impedance Zp, a S-wave impedance Zs, a P-wave velocity-to-S-wave velocity ratio Vp/Vs, a Lamé constant λ, a shear modulus μ, a product λρ of a Lamé constant and a density, a product λμ of a Lamé constant and a shear modulus, a quasi pressure PR, a product μρ of a shear modulus and a density; and the analyzing fluid sensitivity includes: measuring the P-wave velocity Vp and the S-wave velocity Vs in the scale of ultrasonic wave and a wave velocity during variation of saturations of gas and water, that is, a cross-plot of Vp/Vs and a wave impedance.

Step 103: preferably selecting each single-well template to manufacture a work area standard template as a single-well rock physics template built based on each reference well data, where the work area standard template preferably uses a sensitivity parameter λρ as a vertical coordinate and the P-wave impedance as a horizontal coordinate.

Step 104: fine-tuning, based on lateral variations and heterogeneity of reservoir geological features, input parameters of a rock physics template at coordinates of each well according to gas testing situations of all wells in a work area, optimizing the whole work area, building a three-dimensional work area rock physics template data volume, and combining the three-dimensional work area rock physics template data volume with seismic pre-stack inversion to calculate a porosity and a saturation of a target layer; performing large-area three-dimensional rock physics template parameter inversion in the whole work area, smoothing an inversion result, and finally, outputting a reservoir parameter inversion data volume, thereby implementing quantitative interpretation on the porosity and the saturation of the reservoir; and the building a three-dimensional work area rock physics template data volume is cutting and sorting a to-be-inverted and interpreted three-dimensional seismic data volume according to project requirements, performing pre-stack three-dimensional seismic inversion, and performing inverse calculation on the porosity and the saturation of the reservoir.

A further preferable solution of the seismic rock physics inversion method based on a large area tight reservoir provided by the present invention is:

Modeling of the building a multi-scale rock physics model in step 101 includes: calculating an elastic modulus of a rock matrix and an elastic modulus of a rock skeleton, and obtaining an effective elastic modulus of the matrix by using a Voigt-Reuss-Hill average equation:

$$M_{VRH} = \frac{1}{2}\left(\sum_{i=1}^{N} f_i M_i + \frac{1}{\sum_{i=1}^{N} \frac{f_i}{M_i}}\right), \tag{1}$$

where
$M_{VRH}$ is an elastic modulus of a mineral matrix, $f_i$ and $M_i$ are respectively a volume fraction and an elastic modulus of an $i^{th}$ component, N is a total quantity of mineral components; and a bulk modulus and a shear modulus of a dry rock skeleton of a dolomite are calculated by using a differential equivalent medium (DEM) theory (Mavko, 1998):

$$(1-y)d/dy[K^*(y)] = (K_2 - K^*(y))P^{(*2)}(y) \tag{2a}$$

and $$(1-y)d/dy[\mu^*(y)] = (\mu_2 - \mu^*(y))Q^{(*2)}(y) \tag{2b}$$

where initial conditions are $K^*(0) = K_1$ and $\mu^*(0) = \mu_1$, where $K_1$ and $\mu_1$ are a bulk modulus and a shear modulus (phase 1) of an initial principal mineral phase, $K_2$ and $\mu_2$ are a bulk modulus and a shear modulus (phase 2) of a inclusion mineral which is gradually inserted into the host phase, y is a content of the phase 2, and $P^{(*2)}$ and $Q^{(*2)}$ are related to a shape of the embedded inclusions.

Modeling of the building a multi-scale rock physics model in step 101 further includes considering a rock in a reservoir environment and estimating densities and bulk moduli of natural gas of a reservoir fluid under different temperature and pressure conditions by using a van der Waals equation.

Modeling of the building a multi-scale rock physics model in step 101 further includes: considering heterogeneous distribution of a pore fluid, ignoring heterogeneity of a pore structure, predicting P-wave and S-wave velocities of a fluid saturated rock by using a Biot-Rayleigh equation, and in addition, further considering impact of elastic wave velocity dispersion, to implement fusion between multidisciplinary data in different scales, where a specific form of the Biot-Rayleigh equation is as follows:

$$N\nabla^2 u + (A+N)\nabla e + Q_1\nabla(\xi^{(1)} + \phi_2 \zeta) + Q_2\nabla(\xi^{(2)} - \phi_1 \zeta) = \tag{3a}$$
$$\rho_{11}\ddot{u} + \rho_{12}\ddot{U}^{(1)} + \rho_{13}\ddot{U}^{(2)} + b_1(\dot{u} - \dot{U}^{(1)}) + b_2(\dot{u} - \dot{U}^{(2)}),$$

$$Q_1 \nabla e + R_1 \nabla(\xi^{(1)} + \phi_2 \zeta) = \rho_{12}\ddot{u} + \rho_{22}\ddot{U}^{(1)} - b_1(\dot{u} - \dot{U}^{(1)}), \tag{3b}$$

-continued $$Q_2 \nabla e + R_2 \nabla (\xi^{(2)} + \phi_1 \varsigma) = \rho_{13} \ddot{u} + \rho_{33} \ddot{U}^{(2)} - b_2(\dot{u} - \dot{U}^{(2)}), \quad (3c)$$

$$\phi_2(Q_1 e + R_1(\xi^{(1)} + \phi_2 \varsigma)) - \phi_1(Q_2 e + R_2(\xi^{(2)} + \phi_1 \varsigma)), \text{ and}$$

$$= \frac{1}{3} \rho_{f1} \ddot{\varsigma} R_0^2 \frac{\phi_1^2 \phi_2 \phi_{20}}{\phi_{10}} + \frac{1}{3} \frac{\eta_1 \phi_1^2 \phi_2 \phi_{20}}{\kappa} \dot{\varsigma} R_0^2, \quad (3d)$$

where
$u=[u_1, u_2, u_3]$, $U^{(1)}=[U_1^{(1)}, U_2^{(1)}, U_3^{(1)}]$, and $U^{(2)}=[U_1^{(2)}, U_2^{(2)}, U_3^{(2)}]$ respectively denote space vector of displacements of three components (rock skeleton, a fluid 1, and a fluid 2), and subscripts 1, 2, and 3 denote three directions of a vector space; $\zeta$ denotes a local fluid deformation increment induced by the process of seismic wave propagation, and $e_{ij}$, $\xi_{ij}^{(1)}$, and $\xi_{ij}^{(2)}$ are as follows:

$$e_{ij} = \frac{1}{2}\left(\frac{\partial u_i}{\partial x_j} + \frac{\partial u_j}{\partial x_i}\right),$$

$$\xi_{ij}^{(1)} = \frac{1}{2}\left(\frac{\partial U_i^{(1)}}{\partial x_j} + \frac{\partial U_j^{(1)}}{\partial x_i}\right)\delta_{ij}, \text{ and}$$

$$\xi_{ij}^{(2)} = \frac{1}{2}\left(\frac{\partial U_i^{(2)}}{\partial x_j} + \frac{\partial U_j^{(2)}}{\partial x_i}\right)\delta_{ij},$$

where
x1, x2, and x3 respectively denote coordinates in the three directions; $\varphi_1$ and $\varphi_2$ denote absolute porosities of two types of pores, and a total porosity of a rock is $\phi = \phi_1 + \phi_2$; $\varphi_{10}$ and $\varphi_{20}$ respectively denote local porosities in two areas. If a rock merely includes a type of skeleton inside, but saturated with two immiscible fluids, $\phi_{10} = \phi_{20} = \phi$; assuming that $\varphi_1$ represents water-saturated pores (background/host phase fluid), and $\varphi_2$ represents gas-saturated pores (inclusion/patchy phase fluid), $\varphi_1/\varphi$ is a water saturation, and $\varphi_2/\varphi$ is a gas saturation; $\rho_{f1}$ and $\eta_1$ denote a density and a viscosity of a background phase fluid, and $\rho_{f2}$ and $\eta_2$ denote a density and a viscosity of an inclusion phase fluid; $R_0$ refers to the gas pocket radius, and $\kappa_{10}$ denotes a rock permeability; and the mathematic determination equation of the elastic parameters A, N, $Q_1$, $R_1$, $Q_2$, and $R_2$, density parameters $\rho_{11}$, $\rho_{12}$, $\rho_{13}$, $\rho_{22}$, and $\rho_{33}$, and dissipation parameters $b_1$ and $b_2$ are provided.

Step 102 further includes performing comparison and analysis to determine that laws and orders of sensitivities of rock physics parameters in an ultrasonic wave scale and a logging scale are basically consistent and that parameters that are most sensitive to a pore fluid are $\lambda$ and $\lambda \rho$.

In step 103, correcting horizontal and vertical coordinates of a lattice of the work area standard rock physics template means to ensure that description results of the work area standard rock physics template basically cover all pieces of data of a standard well, so that the corrected work area standard rock physics template is expressed as:

Assuming that each grid point position at the single-well rock physics template can be expressed by (Mk(i, j), Nk(i, j)) according to its coordinates in 2D cross-plot, where i and j respectively correspond to the gradual changes of porosity and saturation (i=1, 2 . . . 11 corresponds to that the gradual porosity from 0.02 to 0.12; and j=1, 2 . . . 11 corresponds to that the gradual saturation from 0 to 100%), k denotes a $k^{th}$ reference well, and a value $(M_s(i, j), N_s(i, j))$ at each grid point position of the standard template may be expressed as:

$$M_s(i, j) = \sum_k M_k(i, j) * A(k) * B(i, j), \quad (4a)$$

and $$N_s(i, j) = \sum_k N_k(i, j) * A(k) * C(i, j), \quad (4b)$$

where
A (k) denotes a weight of the $k^{th}$ well, and B(i, j) and C(i, j) respectively denote corrections performed on the horizontal and vertical coordinates of lattices of the work area standard rock physics template at a template lattice corresponding to i and j based on integrated reference data of respective wells.

The reservoir parameter rock physics inversion in step 104 is performing seismic inversion and fluid detection tests at locations of respective wells based on the work area standard rock physics template, where a specific method includes:

Extracting a two-dimensional well through line from the three-dimensional seismic data volume, estimating reservoir and fluid parameters of a target layer near each well location, the results are compared with the known drilling and gas production data of the wells. The template is adjust to assure inversion results and interpretation conclusion being fully consistent with known data; and the seismic inversion template by debugging the standard template through a 2D seismic inversion test near the k-th well can be expressed as $(M'_k(i, j), N'_k(i, j))$.

In the work area, based on the seismic inversion template $(M'_k(i, j), N'_k(i, j))$ of each well, optimizing the whole work area, and generating a three-dimensional data volume of a work area rock physics model, where specifically, there is an independent seismic rock physics model corresponding to each coordinate location (x, y) in the work area, and a template thereof $(M_{3D}(x, y, i, j), N_{3D}(x, y, i, j))$ is determined based on the seismic inversion template of the location of each well:

$$M_{3D}(x, y, i, j) = \sum_{k=1}^{L} M'_k(i, j) * Q(x, y, k), \quad (5a)$$

where if $x \neq x_k, y \neq y_k$, $$N_{3D}(x, y, i, j) = \sum_{k=1}^{L} N'_k(i, j) * Q(x, y, k), \quad (5b)$$

where if $x \neq x_k, y \neq y_k$, $$M_{3D}(x, y, i, j) = M'_k(i, j), \text{ where if } x = x_k, y = y_k, \quad (5a)$$

$$N_{3D}(x, y, i, j) = N'_k(i, j), \text{ where if } x = x_k, y = y_k, \quad (5b)$$

wherein
$(x_k, y_k)$ are coordinates of the k-th well, L is a total number of wells, and Q(x, y, k) is a weight coefficient of the k-th well which is used for calculating a template at the coordinates (x, y) in the work area and may be determined by using the following equation:

$$Q(x, y, k) = \frac{\frac{1}{(x-x_k)^2 + (y-y_k)^2}}{\sum_{k'=1}^{L} \frac{1}{(x-x_{k'})^2 + (y-y_{k'})^2}}, \text{ if } x \neq x_k, y \neq y_k, \quad (6)$$

where
based on the foregoing method, the observed data at each well can be taken into account, and seismic inversion and interpretation of the reservoir parameters are controlled based on logging observation at each geographic location, and the closer spatial distance from the inversion location to a reference well leads to the more remarkable impact from the control of the well; ($M_{3D}(x, y, i, j)$, $N_{3D}(x, y, i, j)$), that is, in a manufacturing process, a work area rock physics model three-dimensional data volume first moves along an xline direction in a seismic data .sgy standard format, and then, is processed along an inline direction one xline by one xline.

In step 104, the porosity and saturation of the inversion are smoothed by using a weighted averaging method, to weaken impact of the outliers of the inversion/interpretation data, where assuming that a target point is closer, impact of the inversion result on the target point is greater, and three types of weighted templates are defined according to two-dimensional normal distribution, as shown in equation (7); $T_1$ and $T_2$ are evolved from two-dimensional Gaussian discrete templates, $T_3$ is a two-dimensional Gaussian template of a 3×3 field, a greatest weight in the templates is a location of the target point, and the templates may be properly adjusted according to a location of minimum uniformity in the neighborhood to form a template related to the neighborhood:

$$T_1 = \frac{1}{9}\begin{pmatrix} 1 & 2 \\ 2 & 4 \end{pmatrix}, T_2 = \frac{1}{25}\begin{pmatrix} 1 & 1 & 2 \\ 1 & 2 & 4 \\ 2 & 4 & 8 \end{pmatrix}, T_3 = \begin{pmatrix} 1 & 2 & 1 \\ 2 & 4 & 2 \\ 1 & 2 & 1 \end{pmatrix}; \quad (7)$$

using $T_1$ as an example, two-dimensional inversion section data (i, j) is smoothed inside the neighborhood, and a specific algorithm may be expressed as:

$$data_s = \sum_{i,j=1}^{2} data(i, j) * T_1(i, j),$$

where
$data_s$ is the numerical value at the target position after smoothing.

An implementation principle of the present invention is that: the present invention includes: predicting a wave response dispersion based on a poroelasticity theory, and building a multi-scale rock physics model, to associate with multi-scale data; analyzing and correcting a logging interpretation result based on the model and gas testing situations of some wells, analyzing fluid sensitivities of rock physics parameters in two scales of acoustic logging and ultrasonic wave, and sifting the rock physics parameters which are most sensitive to a porosity and a gas saturation in a plurality of observation scales; preferably selecting each single-well template to manufacture a work area standard template as a single-well rock physics template built based on each piece of reference well data; and fine-tuning, based on lateral variations and heterogeneity of reservoir geological features, input parameters of a rock physics template at coordinates of each well according to gas testing situations of all wells in a work area, optimizing the whole work area, building a three-dimensional work area rock physics template data volume, and combining the three-dimensional work area rock physics template data volume with seismic pre-stack inversion to calculate rock physics parameters in the large work area.

Advantageous Effect

Compared with the prior art, the present invention has the following significant advantages:

First, the present invention initiates a seismic rock physics inversion method based on a large area tight reservoir, and has an important practical meaning of promotion and application in a large area.

Second, the present invention can effectively improve precision of hydrocarbon seismic prediction by effectively using multi-well data and multi-scale waveform response data and implement quantitative prediction on a reservoir by combining a rock physics model with pre-stack seismic data inversion.

Third, in the present invention, multi-scale fluid sensitivity analysis is performed on rock physics parameters, where based on multi-scale observation, the most sensitive petrophysical parameters are selected for reservoir hydrocarbon prediction.

Fourth, a standard template of a target layer of a work area is built by combining multi-well data and can describe general geographic and rock physics features of the target layer, the template is further used for performing seismic inversion tests on a known well, to build a three-dimensional rock physics template data volume, and lateral heterogeneous variations are considered on the basis of general geographic features, so that the present invention is application to rock physics inversion of seismic parameters in a large work area.

BRIEF DESCRIPTION OF THE DRAWINGS

FIG. 2-1 is a schematic diagram of a calculation result of the variation of bulk modulus (a) of dolomite skeleton versus porosity, and FIG. 2-2 is a schematic diagram of a calculation result of the variation of shear modulus (b) of dolomite skeleton versus porosity.

FIG. 8-1 shows fluid sensitivity analysis on respective rock physics parameters in an ultrasonic wave scale, and FIG. 8-2 shows fluid sensitivity analysis on respective rock physics parameters at the sonic log scale.

FIG. 14-1 shows an inversion result of porosity of reservoir, and FIG. 14-2 shows an inversion result of gas saturation of reservoir.

FIG. 15-1 shows an inversion result of porosity of reservoir, and FIG. 15-2 shows an inversion result of gas saturation of reservoir.

DETAILED DESCRIPTION OF THE INVENTION

Specific implementations of the present invention are further described below in detail with reference to the accompanying drawings and embodiments.

Figure 1:
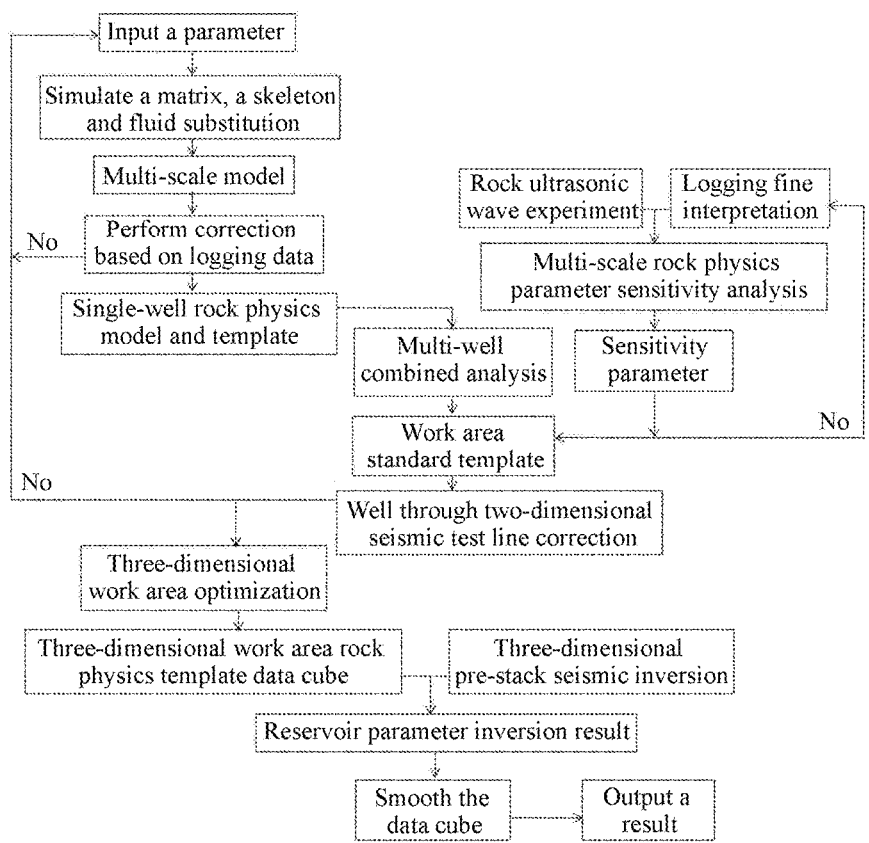
FIG. 1 is a schematic flowchart of a seismic rock physics inversion method based on a large area tight reservoir.

As shown in FIG. 1, a seismic rock physics inversion method based on a large area tight reservoir provided by the present invention includes the following specific steps.

Step 101: predicting a wave response dispersion based on a poroelasticity theory, building a multi-scale rock physics model, to associate with multi-scale data, where the building a multi-scale rock physics model is based on impact exerted by mineral constituents, a pore structure, and a formation environment of a rock on a wave response feature of the rock, and determining that reservoir environmental factors include a temperature and a pressure, reservoir lithological factors include mineral components, a pore shape, a shale content, and a pore structure, and reservoir fluid factors include a fluid viscosity and a gas-water patchy saturation.

Step 102: analyzing and correcting a logging interpretation result based on the model and gas testing situations of some wells, analyzing fluid sensitivities of rock physics parameters in two scales of acoustic logging and ultrasonic wave, and sifting the rock physics parameters which are most sensitive to a porosity and a gas saturation in a plurality of observation scales, where the rock physics parameters in the two scales of acoustic logging and ultrasonic wave are elastic parameters and a combination of the elastic parameters, and the elastic parameters at least include the following physical quantities: a P-wave velocity $V_p$, a S-wave velocity $V_s$, a P-wave impedance $Z_p$, a S-wave impedance $Z_s$, a P-wave velocity-to-S-wave velocity ratio $V_p/V_s$, a Lamé constant k, a shear modulus μ, a product λρ of a Lamé constant and a density, a product λμ of a Lamé constant and a shear modulus, a quasi pressure PR, a product μρ of a shear modulus and a density; and the analyzing fluid sensitivity includes: measuring the P-wave velocity $V_p$ and the S-wave velocity $V_s$ in the scale of ultrasonic wave and a wave velocity during variation of saturations of gas and water, that is, a cross-plot of $V_p/V_s$ and a wave impedance.

Step 103: preferably selecting each single-well template to manufacture a work area standard template as a single-well rock physics template built based on each piece of reference well data, where the work area standard template preferably uses a sensitivity parameter λρ as a vertical coordinate and the P-wave impedance as a horizontal coordinate.

Step 104: fine-tuning, based on lateral variations and heterogeneity of reservoir geological features, input parameters of a rock physics template at coordinates of each well according to gas testing situations of all wells in a work area, optimizing the whole work area, building a three-dimensional work area rock physics template data volume, and combining the three-dimensional work area rock physics template data volume with seismic pre-stack inversion to calculate a porosity and a saturation of a target layer; performing large-area three-dimensional rock physics template parameter inversion in the whole work area, smoothing an inversion result, and finally, outputting a reservoir parameter inversion data volume, thereby implementing quantitative interpretation on the porosity and the saturation of the reservoir; and the building a three-dimensional work area rock physics template data volume is cutting and sorting a to-be-inverted and interpreted three-dimensional seismic data volume according to project requirements, performing pre-stack three-dimensional seismic inversion, and performing inverse calculation on the porosity and the saturation of the reservoir.

According to the embodiments of the present invention, in the seismic rock physics inversion method based on a large area tight reservoir, with regard to a strong heterogeneity feature of a carbonatite reservoir, a mineral composition of the reservoir is analyzed, a dry rock skeleton model of the reservoir is built, and according to an environment of the reservoir, a reservoir fluid model is built, and a multi-scale rock physics model is constructed; and based on the multi-scale rock physics model, an industrialization technology procedure of rock physics inversion on a large work area reservoir and fluid parameters is provided.

According to the embodiments of the present invention, in the seismic rock physics inversion method based on a large area tight reservoir, first, logging data analysis and precise interpretation are performed, and a single-well rock physics model and a template are manufactured; second, rock physics parameter fluid sensitivity analysis in sonic log and an ultrasonic wave scale are performed. Results show that: with a reduction of a porosity, sensitivities of respective parameters are obviously reduced, but an order of the sensitivities of the parameter is basically unchanged; and orders of sensitivities of rock physics parameters in the two scales are basically consistent, but one parameter has different sensitivities to a pore fluid in different observation scales. Parameters λρ and λ that are most sensitive to a gas saturation are preferably selected based on multi-scale sensitivity analysis.

According to the embodiments of the present invention, in the seismic rock physics inversion method based on a large area tight reservoir, to describe a general law of geological features of a target layer, each single-well simulation result is preferably selected to manufacture a work area standard rock physics template, the work area standard rock physics template is combined with a seismic inversion test of each well through two-dimensional line to manufacture a three-dimensional rock physics model data volume in a large work area, the three-dimensional rock physics model data volume is combined with seismic pre-stack inversion to estimate a porosity and a gas saturation of a reservoir, and a smoothing matrix is used for smoothing an inversion result data volume. Comparisons between inversion results and a logging interpretation and a well testing conclusion of a target layer show that the predicted results match an actual formation porosity and an actual natural gas production capacity well.

According to the embodiments of the present invention, in the seismic rock physics inversion method based on a large area tight reservoir, with reference to a rock physics analysis, an industrialization technology procedure of seismic quantitative prediction on a large work area reservoir and fluid parameters has been researched and developed and is successfully applied to a tight dolomite reservoir in West China. In consideration of differences in geological features, reservoir types, and fluid distribution situations of respective work areas, to ensure applicability and accuracy of the rock physics model, an actual situation of a reservoir needs to be taken as a starting point, analysis is performed for different rock lithological properties, different pore structures, and different fluids, and correction is performed with reference to experimental data, logging, and seismic inversion data, so as to effectively apply the seismic rock physics inversion method.

A tight dolomite gas reservoir in the Sichuang Basin is used as an example to describe an implementation process of the seismic rock physics inversion method based on a large area tight reservoir rock.

Figures 1, 2:
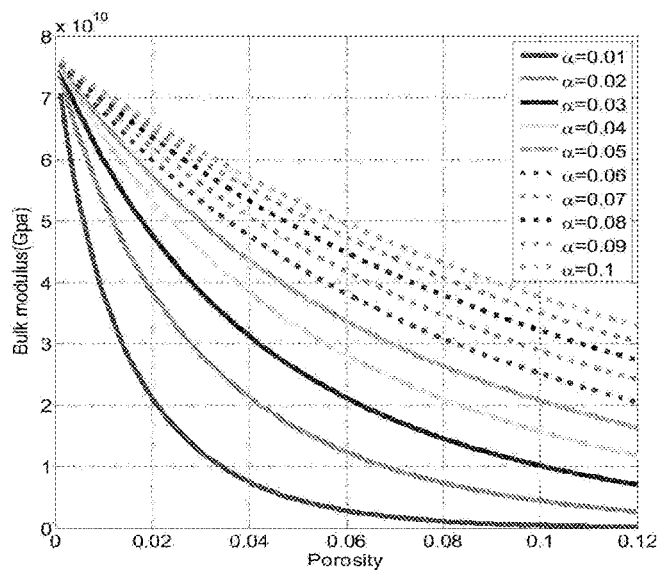
FIG. 2 (including FIG. 2-1 and FIG. 2-2) is schematic diagrams of calculation results of the variations of bulk modulus (a) and shear modulus (b) of dolomite skeleton versus porosity, where
Figure 2:
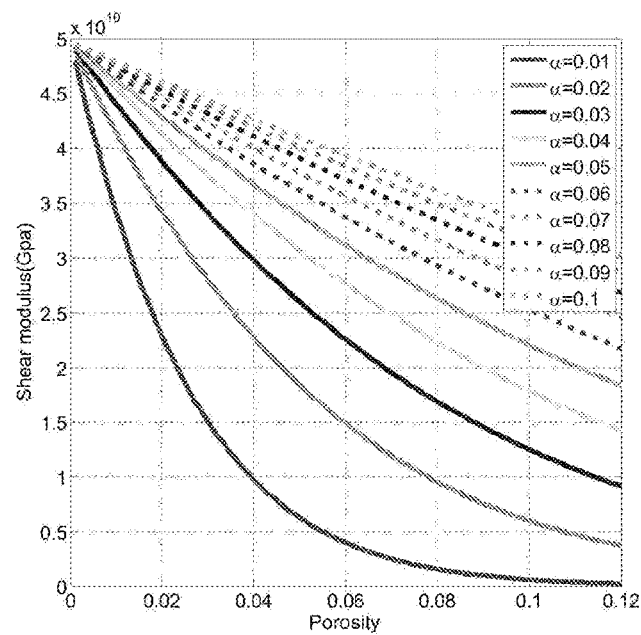

FIG. 2 shows calculation results of relationships of a bulk modulus (a) and a shear modulus (b) of a dolomite skeleton versus porosity provided by this embodiment of the present invention. A relationship curve of a skeleton modulus of dolomite including coin-shaped cracks having different aspect ratios (a) versus a porosity is calculated by using a DEM method, and in the results, in a case of a same porosity, as an aspect ratio of a pore is increased, the skeleton modulus is increased, and in a case of a same aspect ratio, as the porosity is increased, the skeleton modulus is reduced.

Figure 3:
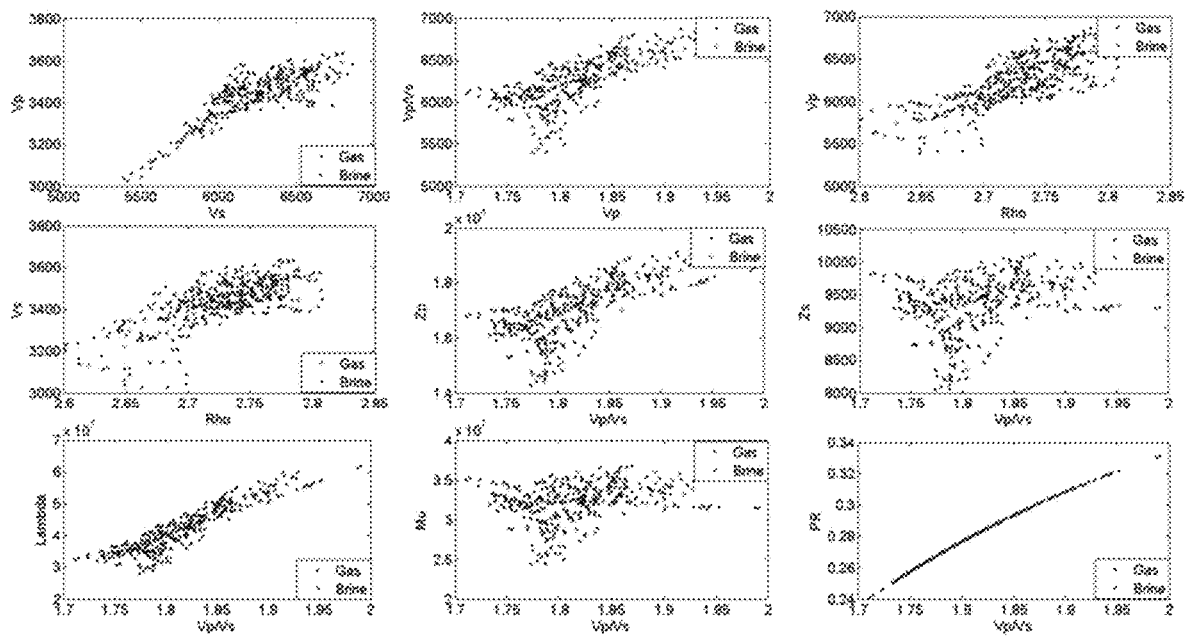
FIG. 3 is a schematic cross-plot of rock physics parameters of well MX204.

FIG. 3 is a cross-plot of logging rock physics parameters of a well in an area MX provided by this embodiment of the present invention. A logging curve may be edited according to a distribution law and a dispersion degree of logging data, to remove a wild value. In addition, a logging interpretation conclusion is compared with an actual well testing result, precise interpretation is performed on the logging data, and a porosity and a gas-containing capability (a saturation) obtained from the precise interpretation may be used for calibrating rock physics model input parameters.

Figure 4:
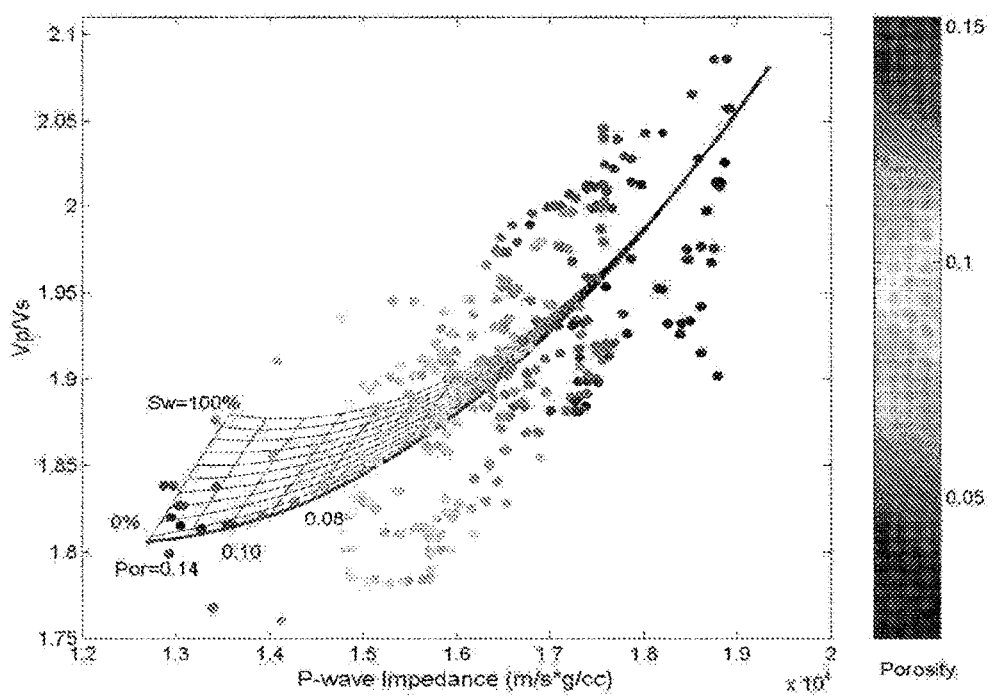
FIG. 4 is a schematic diagram of rock physics interpretation template of well MX9.
Figure 5:
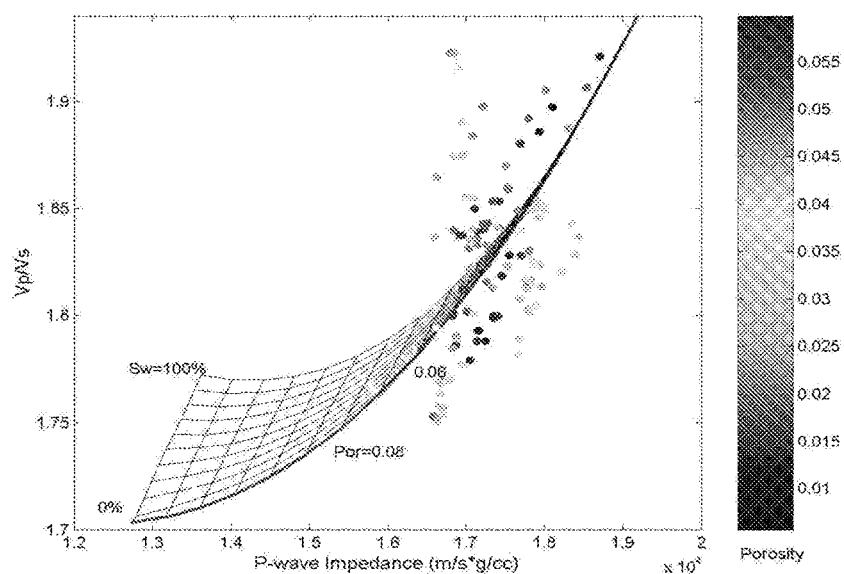
FIG. 5 is a schematic diagram of rock physics interpretation template of well MX12.

FIG. 4 and FIG. 5 show comparisons between rock physics interpretation templates of a well MX9 and a well MX12 and actual reservoir porosity interpretation results provided by the embodiments of the present invention. The comparisons show that because of diversity in terms of carbonatite reservoir type and heterogeneity in terms of pore fluid distribution, it is difficult for a rock physics template built based on a single pore structure and a single distribution mode to cover relatively dispersed actual data, and the rock physics template built based on a single pore structure and a single distribution mode cannot effectively help recognize lithological properties and fluids. In addition, because lateral heterogeneity exists between wells, respective single-well templates are different from each other. Therefore, it is difficult for a rock physics template built based on a single well to represent a favorable reservoir of the whole work area. Such a problem is particularly notable in actual application in a large work area.

Figures 1, 6:
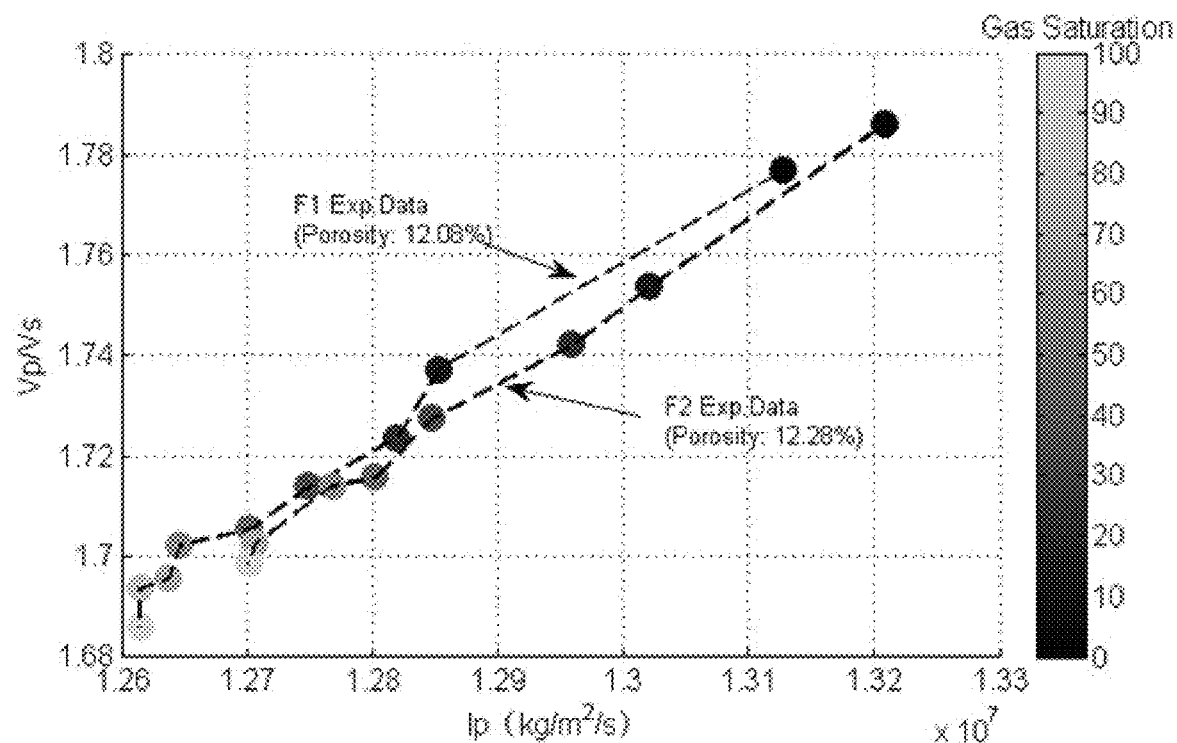
FIG. 6 (including FIG. 6-1 and FIG. 6-2) is a schematic cross-plot of Vp/Vs and wave impedance for dolomite sample.
Figures 2, 6:
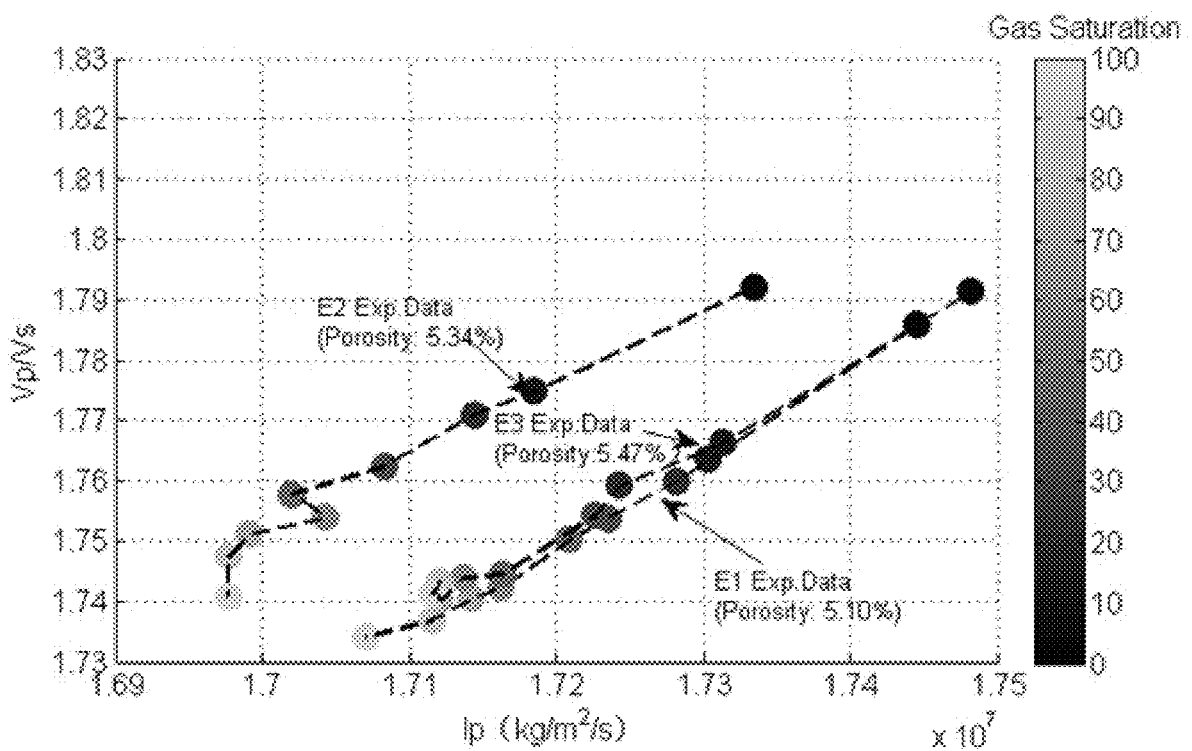

FIG. 6 is a cross-plot of Vp/Vs ratios and wave impedances of five rock core dolomite samples provided by this embodiment of the present invention.

Figure 7:
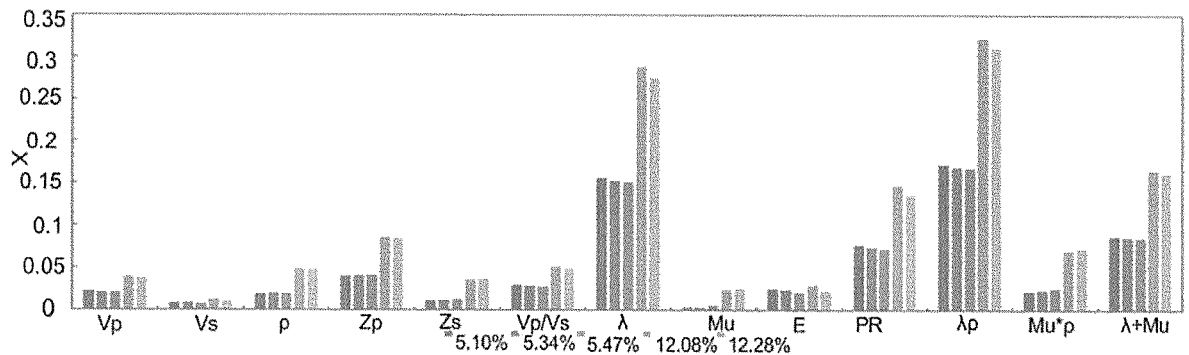
FIG. 7 is a schematic diagram of analysis on fluid sensitivities of rock physics parameters of different rock samples.

As shown in FIG. 7, in this embodiment of the present invention, to survey impact of a lithological porosity on a rock parameter, according to actual testing data of five dolomite samples whose porosities are 0.051, 0.0534, 0.0547, 0.1208, and 0.1228, sensitivities of lithological elastic parameters and an elastic parameter combination in an ultrasonic wave scale to a gas-containing capacity of a reservoir are compared and analyzed. Statistical results show that: as shown in FIG. 8, as the porosity is reduced, sensitivities of the respective parameters are obviously reduced, and an order of sensitivities of the respective parameters is slightly changed, but a basic tendency is not changed; and $\lambda$ and $\lambda\rho$ are most sensitive to a change of a gas saturation, and $\mu$ and $V_s$ are most insensitive to the gas saturation.

Figures 1, 8:
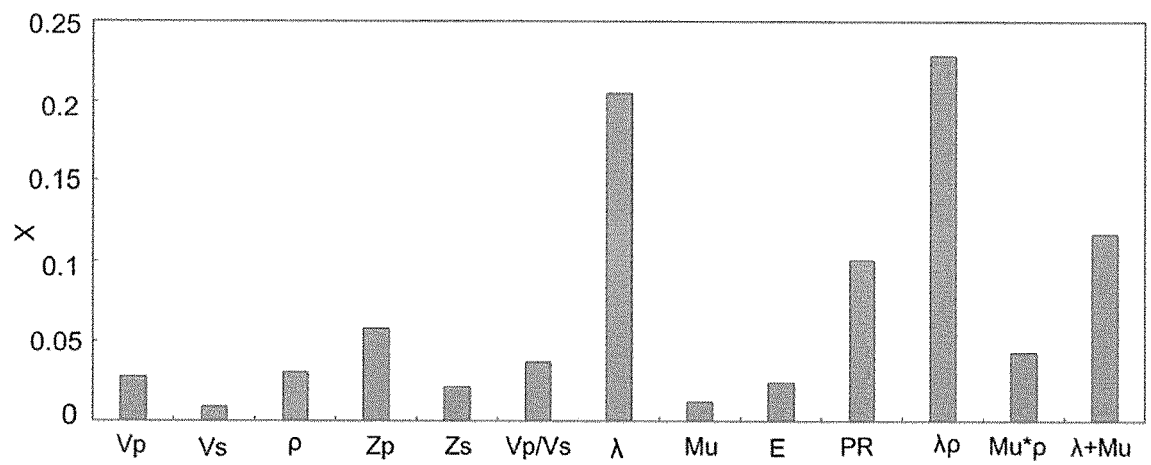
FIG. 8 (including FIG. 8-1 and FIG. 8-2) is schematic diagrams of fluid sensitivity analysis on rock parameters at different observation scales, where
Figures 2, 8:
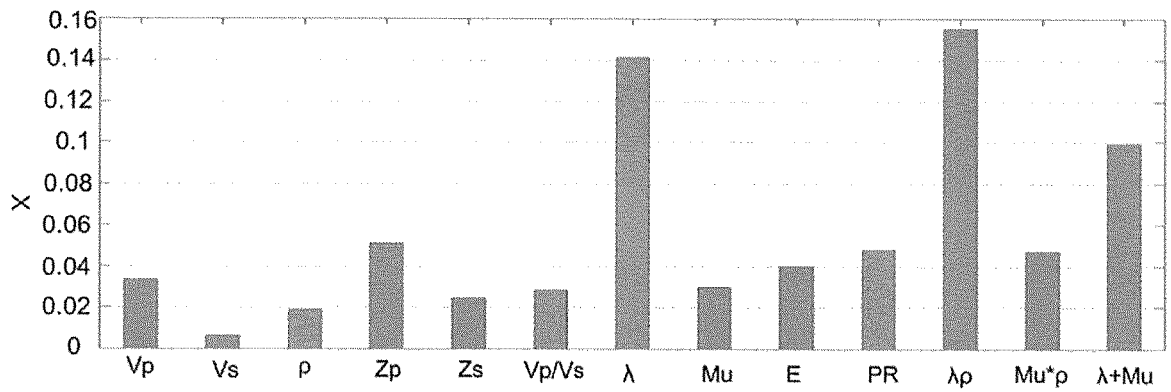
Figure 9:
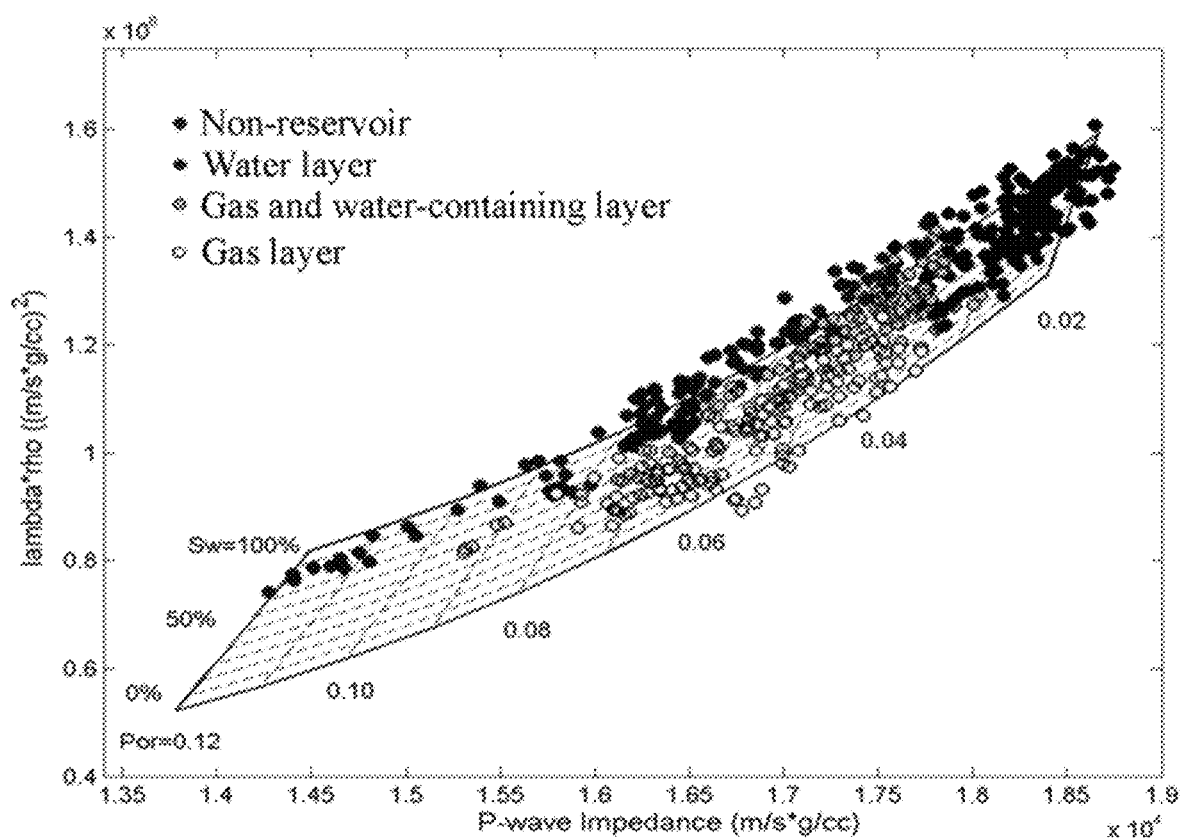
FIG. 9 is a schematic diagram of a cross-plot of a work area standard rock physics template, a P-wave impedance, and λρ (based on wells MX203, 204, 26, and 27).

As shown in FIG. 8, in this embodiment of the present invention, to survey sensitivities of rock physics parameters to a pore fluid in different observation scales, starting from five dolomite samples and data of seven wells, sensitivity calculation results in an ultrasonic wave scale and a logging scale are compared and analyzed, as shown in FIG. 9.

The comparison shows that laws and orders of sensitivities of rock physics parameters in the two scales are basically consistent and parameters that are most sensitive to a pore fluid are k and $\lambda\rho$. Sensitivities of a few parameters to the fluid are slightly changed in different observation scales, for example, is most insensitive to the pore fluid in the ultrasonic wave scale, but its sensitivity to the fluid is increased in a sonic logging scale. Changes between the scales increase difficulty in reservoir fluid recognition. By means of the foregoing comparison and analysis, parameters $\lambda$ and $\lambda\rho$ that are most sensitive to the fluid in two observation scales are preferably selected as a basis of subsequent reservoir prediction and fluid.

FIG. 9 is a cross-plot of a work area standard rock physics template, a P-wave impedance, and $\lambda\rho$ provided by this embodiment of the present invention. Logging interpretation results are projected to a corrected rock physics template. The results show that a highly water-containing reservoir in a logging interpretation in a work area is distributed near a water saturation line in the template, and its porosity distribution range is 2.8% to 12%; a highly gas-containing reservoir in the interpretation is distributed near a gas saturation line in the template, and its porosity distribution range is 3% to 9.2%; and a non-reservoir in the interpretation is distributed in a low-porosity area in the template, and its porosity is basically below 4%. Gas testing situations of key formations of all key wells in a work area can basically be described by using this template, and this template reflects a general feature of porosity distribution of a target layer.

Figure 10:
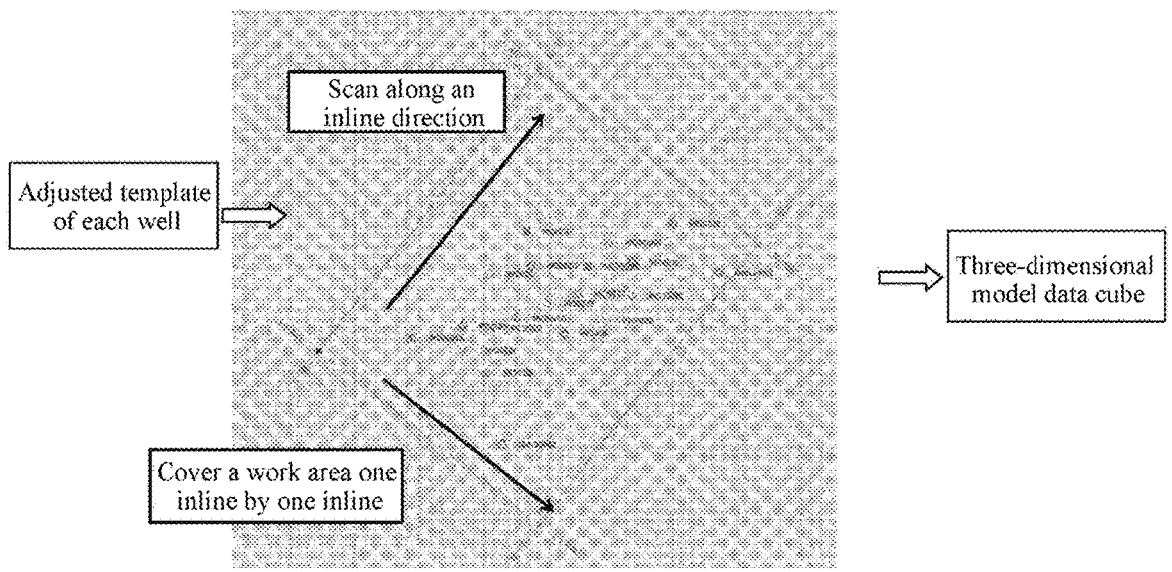
FIG. 10 is a schematic diagram for outputting the 3D rock physics model data volume in the work area.

As shown in FIG. 10, in this embodiment of the present invention, $(M_{3D}(X, y, i, j), N_{3D}(x, y, i, j))$ is a work area rock physics model three-dimensional data volume, and during a manufacturing process, first moves along an xline direction in a seismic data .sgy standard format, and then, is processed along an inline direction one xline by one xline.

Figure 11:
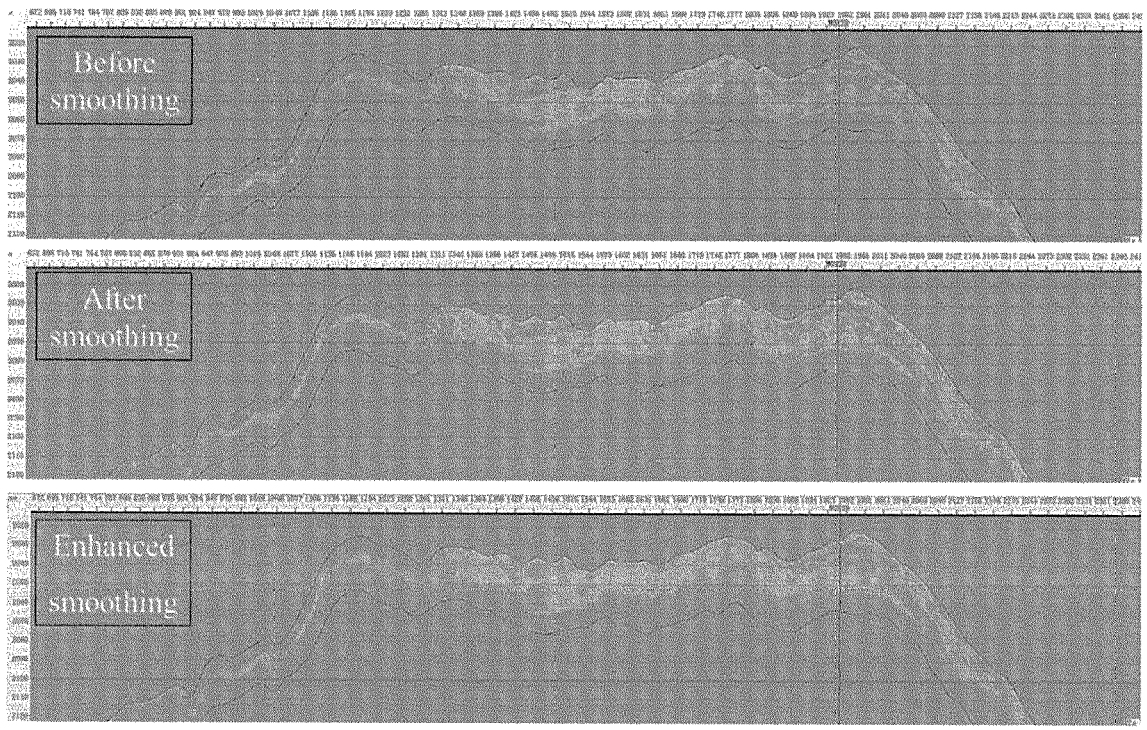
FIG. 11 is a schematic diagram of a comparison between 2D crossing-well MX8 seismic inversion sections of the porosity before smoothing and after smoothing.

As shown in FIG. 11, in this embodiment of the present invention, comparison is performed between a well MX8-through porosity inversion cross section before smoothing and a well MX8-through porosity inversion cross section after smoothing to know that the porosity inversion cross section is obviously improved in terms of spatial continuity.

Figure 12:
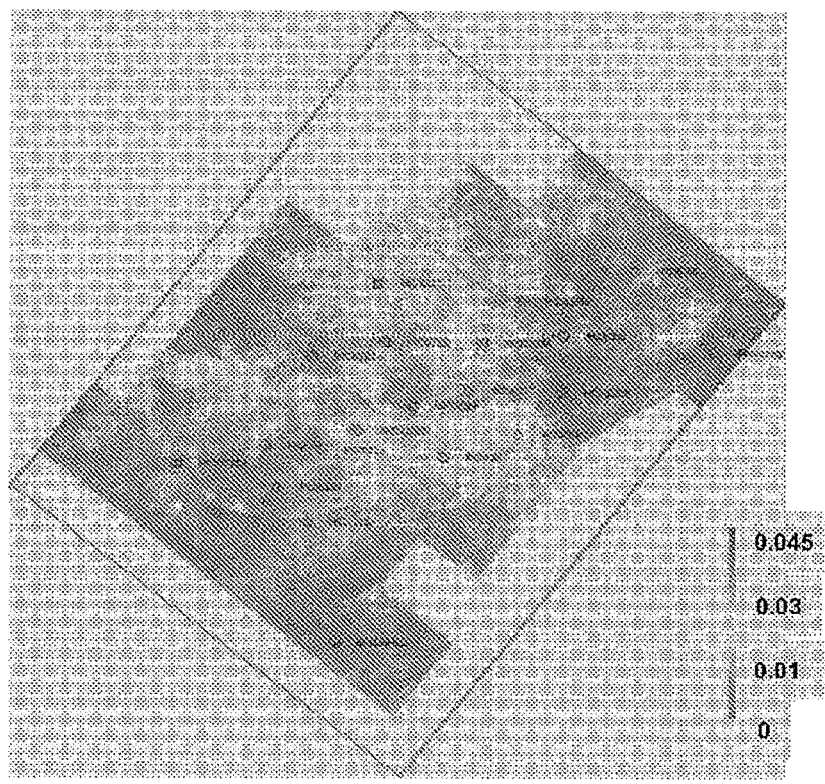
FIG. 12 is a schematic diagram of inversion results of the reservoir average porosity in the work area.

FIG. 12 shows this embodiment of the present invention and shows average porosity inversion results of a large work area reservoir having thousands square kilometers. The inversion results show that: a reservoir of the target layer has a low-porosity and low-permeability features, and an average porosity range of the reservoir is 0 to 0.045, and high-quality reservoirs are mainly distributed in a concentrated manner in parts having high structures in the middle of the work area.

Figure 13:
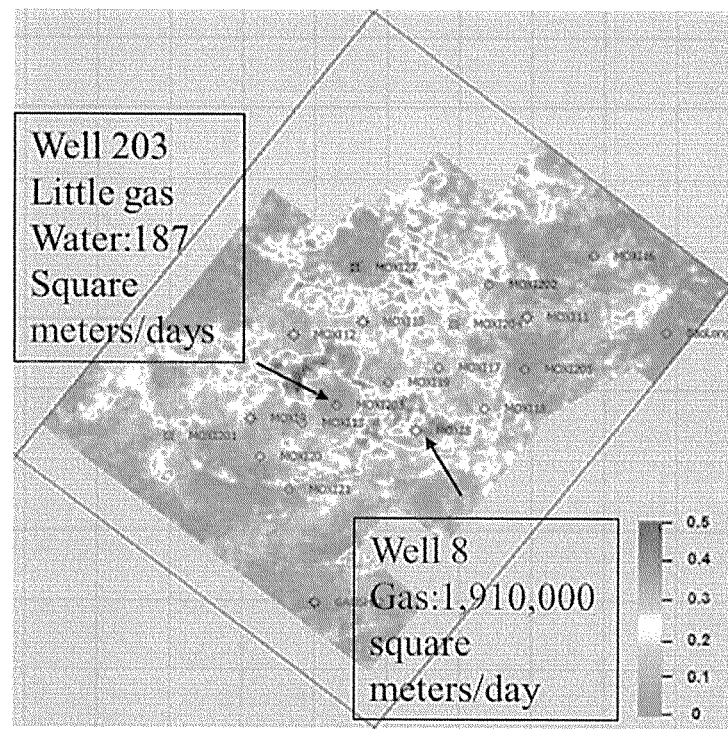
FIG. 13 is a schematic diagram of inversion results of the reservoir average gas saturation in the work area.

FIG. 13 shows this embodiment of the present invention and shows average gas saturation inversion results of a reservoir. A prediction result shows that gas-enriched areas are distributed in a concentrated manner in upper and lower areas. Such a result is consistent with recognition in the previous petroleum geological study for this region. In addition, the inversion results also agree with the gas production report data of the most wells, for example, a well MX203 having gas at the top and water at the bottom and a well MX8 having a high gas production capacity, and the inversion result are all consistent with actual situations.

Figures 1, 14:
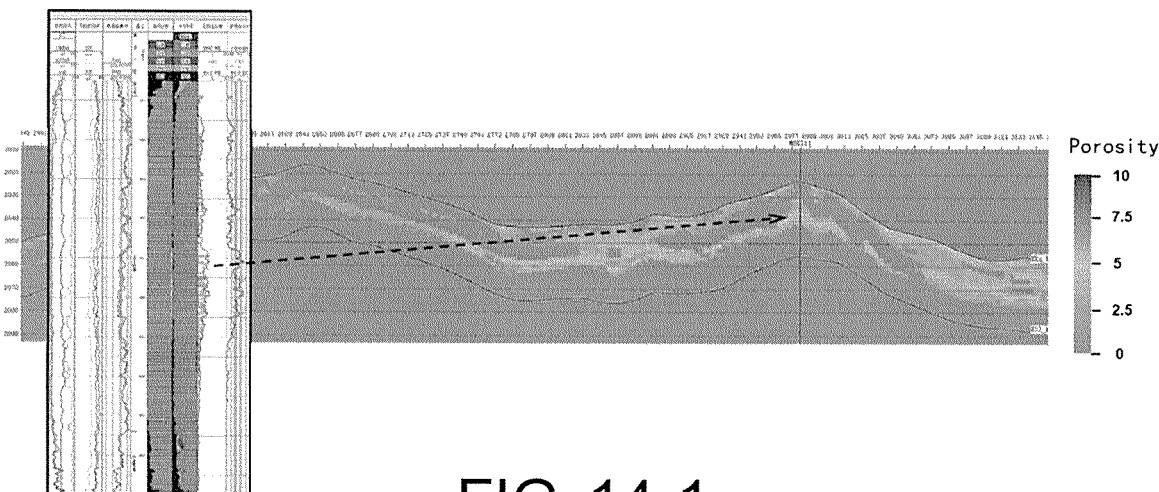
FIG. 14 (including FIG. 14-1 and FIG. 14-2) is schematic diagrams of inversion results of porosity and gas saturation of well MX13-through reservoir, where
Figures 2, 14:
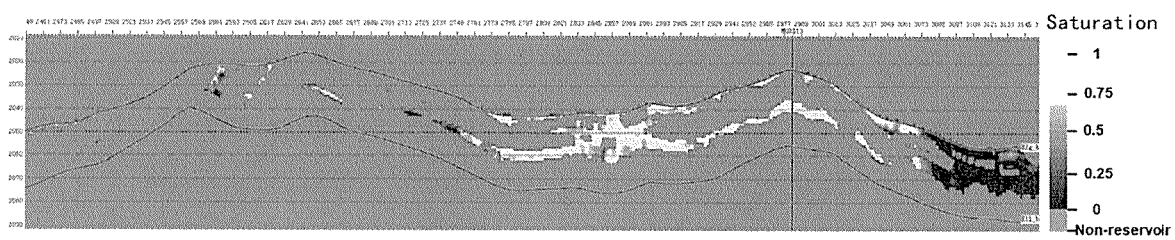
Figures 1, 15:
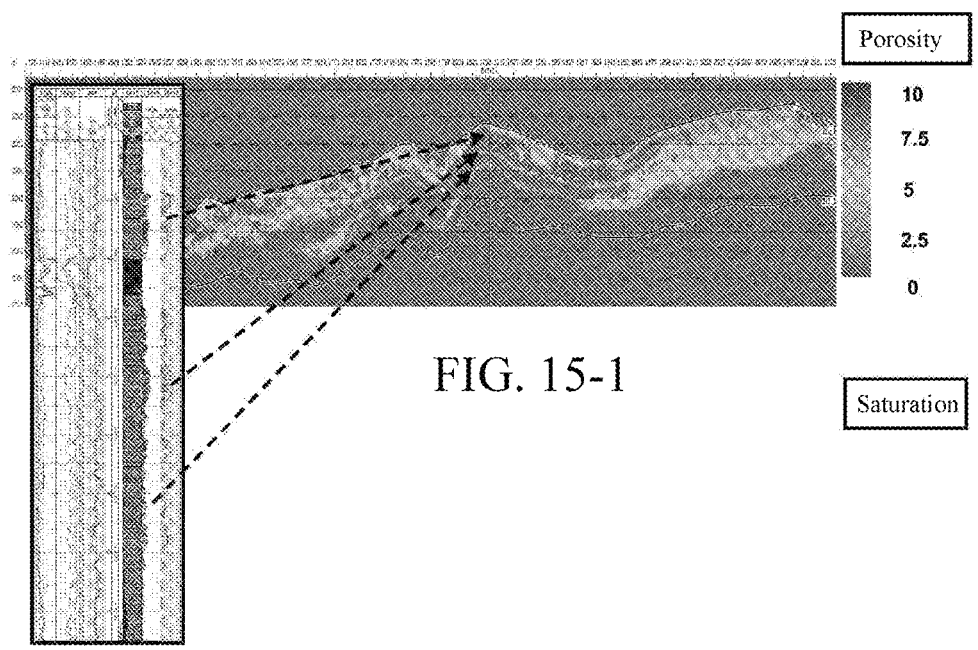
FIG. 15 (including FIG. 15-1 and FIG. 15-2) is schematic diagrams of inversion results of porosity and gas saturation of well MX17-through reservoir, where
Figures 2, 15:
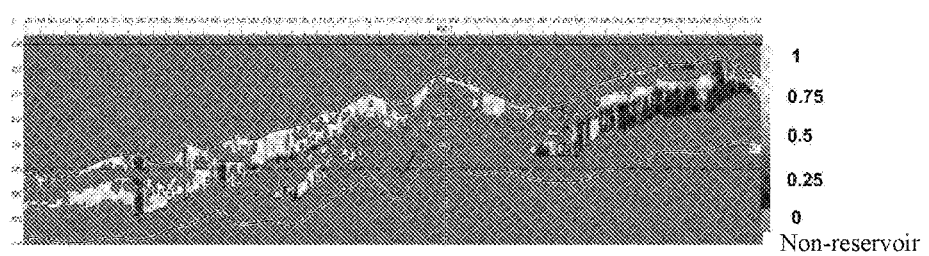

FIG. 14 and FIG. 15 show this embodiment of the present invention. As shown in FIG. 14 and FIG. 15, in the two 2D crossing-well sections which are extracted from the 3D rock physics inversion data volume, the inversion results are compared with the log interpretation results and gas production test data.

FIG. 14 shows prediction results of a porosity and a gas saturation of crossing well MX13 reservoir. Upon comparison, it is found that the porosity from the seismic inversion is basically consistent with a rock core porosity of the logging data interpretation, and the seismic inversion effectively recognizes a high-quality reservoir section in the middle of the target layer. The gas saturation results show that the well MX13 has a strong gas-bearing potential which is consistent with gas production data (gas daily produced by a target layer of the well reaches 128,840,000 square meters/day). A water-bearing capacity is shown at a part of a lower structure of the cross section. The inversion results preliminarily show a possibility in direct seismic recognition on an interface between gas and water. FIG. 15 shows inversion results of a porosity and a gas saturation of a crossing well MX17 reservoir. The results show that three gas-bearing thin layers are provided logging interpretation conclusion are precisely recognized in the seismic inversion results, and match the gas testing results (gas daily produced by the well is 532,000 square meters/day).

Descriptions not included in the specific implementations of the present invention are well-known technologies in the art and can be carried out by referring to well-known technologies.

The present invention is verified by repetitious experiments, and satisfying trial results are achieved.

The foregoing specific implementations and embodiments specifically support the technical concept of the seismic rock physics inversion method based on a large area tight reservoir provided by the present invention, and cannot be used to limit a protection scope of the present invention. Any equivalent changes or equivalent modifications made on the basis of the present technical solution according to the technical concept provided in the present invention all fall within the protection scope of the technical solution of the present invention.

What is claimed is:

1. A seismic rock physics inversion method based on a large area tight reservoir, wherein comprising the following specific steps:

step 101: predicting, by a processor, a wave response dispersion based on a poroelasticity theory, building, by the processor, a multi-scale rock physics model, to associate with multi-scale data, wherein the building the multi-scale rock physics model, by the processor, is based on impact exerted by mineral constituents, a pore structure, and a formation environment of a rock on a wave response feature of the rock, and determining that reservoir environmental factors comprise a temperature and a pressure, reservoir lithological factors comprise mineral components, a pore shape, a shale content, and a pore structure, and reservoir fluid factors comprise a fluid viscosity and a gas-water patchy saturation;

step 102: analyzing and correcting, by the processor, a logging interpretation result based on a model and gas testing situations of reference wells obtained by sensors, analyzing, by the processor, fluid sensitivity of rock physics parameters in two scales of acoustic logging and ultrasonic wave, and sifting the rock physics parameters which are most sensitive to a porosity and a gas saturation in a plurality of observation scales, wherein the rock physics parameters in the two scales of acoustic logging and ultrasonic wave are elastic parameters and a combination of the elastic parameters, and the elastic parameters at least comprise the following physical quantities: a P-wave velocity Vp, a S-wave velocity Vs, a P-wave impedance Zp, a S-wave impedance Zs, a P-wave velocity-to-S-wave velocity ratio Vp/Vs, a Lamé constant $\lambda$, a shear modulus $\mu$, a product $\lambda\rho$ of a Lamé constant and a density, a product $\lambda\mu$ of a Lamé constant and a shear modulus, a quasi pressure PR, a product $\mu\rho$ of a shear modulus and a density; and the analyzing fluid sensitivity comprises: measuring the P-wave velocity Vp and the S-wave velocity Vs in the scale of ultrasonic wave and a wave velocity during variation of saturations of gas and water, that is, a cross-plot of Vp/Vs and a wave impedance;

step 103: preferably selecting, by the processor, each single-well template to manufacture a work area standard template as a single-well rock physics template built based on each piece of reference well data obtained by the sensors, wherein the work area standard template preferably uses the product $\lambda\rho$ of the Lamé constant and the density as a vertical coordinate and the P-wave impedance as a horizontal coordinate;

step 104: fine-tuning, by the processor, based on lateral variations and heterogeneity of reservoir geological features, input parameters of a rock physics template at coordinates of each well according to gas testing situations of all wells in a large work area, optimizing, by the processor, the whole work area, building, by the processor, a three-dimensional work area rock physics template data volume, and combining, by the processor, the three-dimensional work area rock physics template data volume with seismic pre-stack inversion to calculate a porosity and a saturation of a target layer; performing, by the processor, large-area three-dimensional rock physics template parameter inversion in the whole work area, smoothing, by the processor, an inversion result, and finally, outputting, by the processor, a reservoir parameter inversion data volume to a display, thereby implementing quantitative interpretation on the porosity and the saturation of the reservoir; and the building the three-dimensional work area rock physics template data volume is cutting and sorting a to-be-inverted and interpreted three-dimensional seismic data volume according to project requirements, performing pre-stack three-dimensional seismic inversion, and performing inverse calculation on the porosity and the saturation of the reservoir; and step 105: predicting, by the processor, an amount of hydrocarbon of the reservoir based on the porosity and the saturation of the reservoir calculated in step 104 to determine gas enriched areas of the reservoir.

2. The seismic rock physics inversion method based on a large area tight reservoir according to claim 1, wherein modeling of the building the multi-scale rock physics model, by the processor, in step 101 comprises: calculating, by the processor, an elastic modulus of a rock matrix and an elastic modulus of a rock skeleton, and obtaining, by the processor, an effective elastic modulus of the rock matrix by using a Voigt-Reuss-Hill average equation:

$$M_{VRH} = \frac{1}{2}\left(\sum_{i=1}^{N} f_i M_i + \frac{1}{\sum_{i=1}^{N}\frac{f_i}{M_i}}\right), \quad (1)$$

wherein $M_{VRH}$ is an elastic modulus of a mineral matrix, $f_i$ and $M_i$ are respectively a volume fraction and an elastic modulus of an $i^{th}$ component, N is a total quantity of mineral components; and a bulk modulus and a shear modulus of a dry rock skeleton of a dolomite are calculated by using a differential equivalent medium (DEM) theory:

$$(1-y)d/dy[K^*(y)] = (K_2 - K^*(y))P^{(*2)}(y) \quad (2a)$$

$$(1-y)d/dy[\mu^*(y)] = (\mu_2 - \mu^*(y))Q^{(*2)}(y) \quad (2b),$$ where initial conditions are $K^*(0) = K_1$ and $\mu^*(0) = \mu_1$, where $K_1$ and $\mu_1$ are a bulk modulus and a shear modulus of a primary-phase material (a phase 1) of an initial principal mineral phase, $K_2$ and $\mu_2$ are a bulk modulus and a shear modulus of a inclusion mineral which is gradually inserted into the host phase (a phase 2), y is a content of the phase 2, and $P^{(*2)}$ and $Q^{(*2)}$ are related to a shape of the embedded inclusions.

3. The seismic rock physics inversion method based on a large area tight reservoir according to claim 1, wherein modeling of the building the multi-scale rock physics model, by the processor, in step 101 further comprises considering, by the processor, a rock in a reservoir environment and estimating, by the processor, densities and bulk moduli of natural gas of a reservoir fluid under different temperature and pressure conditions by using a van der Waals equation.

4. The seismic rock physics inversion method based on a large area tight reservoir according to claim 1, wherein modeling of the building the multi-scale rock physics model by the processor in step 101 further comprises: considering, by the processor, heterogeneous distribution of the pore fluid, ignoring heterogeneity of a pore structure, predicting, by the processor, P-wave and S-wave velocities of a fluid saturated rock by using a Biot-Rayleigh equation, and in addition, further considering, by the processor, impact of elastic wave velocity dispersion, to implement fusion between multidisciplinary data in different scales, wherein a specific form of the Biot-Rayleigh equation is as follows:

$$N\nabla^2 u + (A+N)\nabla e + Q_1 \nabla(\xi^{(1)} + \phi_2 \varsigma) + Q_2 \nabla(\xi^{(2)} - \phi_1 \varsigma) = \quad (3a)$$
$$\rho_{11}\ddot{u} + \rho_{12}\ddot{U}^{(1)} + \rho_{13}\ddot{U}^{(2)} + b_1(\dot{u} - \dot{U}^{(1)}) + b_2(\dot{u} - \dot{U}^{(2)}),$$

-continued $$Q_1 \nabla e + R_1 \nabla(\xi^{(1)} + \phi_2 \varsigma) = \rho_{12}\ddot{u} + \rho_{22}\ddot{U}^{(1)} - b_1(\dot{u} - \dot{U}^{(1)}), \quad (3b)$$

$$Q_2 \nabla e + R_2 \nabla(\xi^{(2)} + \phi_1 \varsigma) = \rho_{13}\ddot{u} + \rho_{33}\ddot{U}^{(2)} - b_2(\dot{u} - \dot{U}^{(2)}), \quad (3c)$$

$$\phi_2(Q_1 e + R_1(\xi^{(1)} + \phi_2 \varsigma)) - \phi_1(Q_2 e + R_2(\xi^{(2)} + \phi_1 \varsigma)) = \quad (3d),$$
$$\frac{1}{3}\rho_{f1} \ddot{\varsigma} R_0^2 \frac{\phi_1^2 \phi_2 \phi_{20}}{\phi_{10}} + \frac{1}{3}\frac{\eta_1 \phi_1^2 \phi_2 \phi_{20}}{\kappa} \dot{\varsigma} R_0^2,$$

wherein
$u = [u_1, u_2, u_3]$, $U^{(1)} = [U_1^{(1)}, U_2^{(1)}, U_3^{(1)}]$, and $U^{(2)} = [U_1^{(2)}, U_2^{(2)}, U_3^{(2)}]$ respectively denote space vector displacements of three components (a skeleton, a fluid 1, and a fluid 2), and subscripts 1, 2, and 3 denote three directions of a vector space; $\varsigma$ denotes a local fluid deformation increment induced by the process of seismic wave propagation, and $e_{ij}$, $\xi_{ij}^{(1)}$, and $\xi_{ij}^{(2)}$ are:

$$e_{ij} = \frac{1}{2}\left(\frac{\partial u_i}{\partial x_j} + \frac{\partial u_j}{\partial x_i}\right),$$

$$\xi_{ij}^{(1)} = \frac{1}{2}\left(\frac{\partial U_i^{(1)}}{\partial x_j} + \frac{\partial U_j^{(1)}}{\partial x_i}\right)\delta_{ij},$$

$$\xi_{ij}^{(2)} = \frac{1}{2}\left(\frac{\partial U_i^{(2)}}{\partial x_j} + \frac{\partial U_j^{(2)}}{\partial x_i}\right)\delta_{ij},$$

wherein
x1, x2, and x3 respectively denote coordinates in the three directions; $\varphi_1$ and $\varphi_2$ denote absolute porosities of two types of pores, and a total porosity of a rock is $\phi = \phi_1 + \phi_2$; $\varphi_{10}$ and $\varphi_{20}$ respectively denote local porosities in two areas, wherein if a rock merely comprises a type of skeleton inside, but is saturated with two types of fluids, $\phi_{10} = \phi_{20} = \phi$; assuming that $\varphi_1$ denotes a water pore (a background phase fluid), and $\varphi_2$ denotes a gas pore (an inclusion phase fluid), $\varphi_1/\varphi$ is a water saturation, and $\varphi_2/\varphi$ is a gas saturation; $\rho_{f1}$ and $\eta_1$ denote a density and a viscosity of a background phase fluid, and $\rho_{f2}$ and $\eta_2$ denote a density and a viscosity of an inclusion phase fluid; $R_0$ refers to the gas pocket radius, and $\kappa_{10}$ denotes a rock permeability; and the mathematic determination equation of the elastic parameters A, N, $Q_1$, $R_1$, $Q_2$, and $R_2$, density parameters $\rho_{11}$, $\rho_{12}$, $\rho_{13}$, $\rho_{22}$, and $\rho_{33}$, and dissipation parameters $b_1$ and $b_2$ are provided.

5. The seismic rock physics inversion method based on a large area tight reservoir according to claim 1, wherein step 102 further comprises performing, by the processor, comparison and analysis to determine that laws and orders of sensitivities of rock physics parameters in an ultrasonic wave scale and a logging scale are basically consistent and that parameters that are most sensitive to a pore fluid are $\lambda$ and $\lambda\rho$.

6. The seismic rock physics inversion method based on a large area tight reservoir according to claim 1, wherein in step 103, correcting, by the processor, horizontal and vertical coordinates of a lattice of the work area standard rock physics template means to ensure that description results of the work area standard rock physics template basically cover all pieces of data of the reference wells obtained by the sensors, so that the corrected work area standard rock physics template is expressed as:

assuming that each grid point position at the single-well rock physics template can be expressed by (Mk(i, j), Nk(i, j)) according to its coordinates in 2D cross-plot, wherein i and j respectively correspond to the gradual changes of porosity and saturation (i=1, 2 . . . 11 corresponds to that the gradual porosity from 0.02 to 0.12; and j=1, 2 . . . 11 corresponds to that the gradual saturation from 0 to 100%), k denotes a $k^{th}$ reference well, and a value ($M_s(i, j)$, $N_s(i, j)$) at each grid point position of the standard template may be expressed as:

$$M_s(i, j) = \sum_k M_k(i, j) * A(k) * B(i, j), \tag{4a}$$

$$N_s(i, j) = \sum_k N_k(i, j) * A(k) * C(i, j), \tag{4b}$$

wherein
A(k) denotes a weight of the $k^{th}$ reference well, and B(i, j) and C(i, j) respectively denote corrections performed on the horizontal and vertical coordinates of lattices of the work area standard rock physics template at a template lattice corresponding to i and j based on integrated reference data of respective reference wells obtained by the sensors.

7. The seismic rock physics inversion method based on a large area tight reservoir according to claim 1, wherein the reservoir parameter rock physics inversion in step 104 is performing, by the processor, seismic inversion and fluid detection tests at locations of respective reference wells based on the work area standard rock physics template, wherein a specific method comprises:
   extracting, by the processor, a two-dimensional well through line from the three-dimensional seismic data volume, estimating, by the processor, reservoir and fluid parameters of a target layer near each reference well location, the results are compared with the known drilling and gas production data of the reference wells obtained by the sensors, the template is adjust to assure inversion results and interpretation conclusion being fully consistent with known data; and the seismic inversion template by debugging the standard template through a 2D seismic inversion test near the k-th reference well can be expressed as ($M'_k(i, j)$, $N'_k(i, j)$); and
in the work area, based on the seismic inversion template ($M'_k(i, j)$, $N'_k(i, j)$) of each reference well, optimizing, by the processor, the whole work area, and generating, by the processor, a three-dimensional data volume of a work area rock physics model, wherein specifically, there is an independent seismic rock physics model corresponding to each coordinate location (x, y) in the work area, and a template thereof ($M_{3D}(x, y, i, j)$, $N_{3D}(x, y, i, j)$) is determined based on the seismic inversion template of the location of each reference well:

$$M_{3D}(x, y, i, j) = \sum_{k=1}^{L} M'_k(i, j) * Q(x, y, k), \tag{5a}$$

where if $x \neq x_k, y \neq y_k$, $$N_{3D}(x, y, i, j) = \sum_{k=1}^{L} N'_k(i, j) * Q(x, y, k), \tag{5b}$$

where if $x \neq x_k, y \neq y_k$, $$M_{3D}(x, y, i, j) = M'_k(i, j), \text{ where if } x = x_k, y = y_k; \tag{5a}$$

$$N_{3D}(x, y, i, j) = N'_k(i, j), \text{ where if } x = x_k, y = y_k, \tag{5b}$$

wherein
($x_k$, $y_k$) are coordinates of the $k_{th}$ reference well, L is a total quantity of reference wells, and Q(x, y, k) is a weight coefficient of the $k_{th}$ reference well used for calculating a template at the coordinates (x, y) in the work area and may be determined by using the following equation:

$$Q(x, y, k) = \frac{\frac{1}{(x-x_k)^2 + (y-y_k)^2}}{\sum_{k'=1}^{L} \frac{1}{(x-x_{k'})^2 + (y-y_{k'})^2}}, \tag{6}$$

wherein if $x \neq x_k, y \neq y_k$ based on the foregoing method, the observed data at each reference well can be taken into account, and seismic inversion and interpretation of the reservoir parameters is controlled based on logging observation at each geographic location, and the closer spatial distance from the inversion location to the reference well leads to the more remarkable impact from the control of the reference well; ($M_{3D}(x, y, i, j)$, $N_{3D}(x, y, i, j)$), that is, in a manufacturing process, a work area rock physics model three-dimensional data volume first moves along an xline direction in a seismic data .sgy standard format, and then, is processed along an inline direction one xline by one xline.

8. The seismic rock physics inversion method based on a large area tight reservoir according to claim 1, wherein in step 104, the porosity and saturation of the inversion are smoothed by using, by the processor, a weighted averaging method, to weaken impact of the outliers of the inversion/interpretation data, wherein assuming that a target point is closer, impact of the inversion result on the target point is greater, and three types of weighted templates are defined according to two-dimensional normal distribution, as shown in equation (7); $T_1$ and $T_2$ are evolved from two-dimensional Gaussian discrete templates, $T_3$ is a two-dimensional Gaussian template of a 3×3 field, a greatest weight in the templates is a location of the target point, and the templates may be properly adjusted according to a location of minimum uniformity in the neighborhood to form a template related to the neighborhood:

$$T_1 = \frac{1}{9}\begin{pmatrix} 1 & 2 \\ 2 & 4 \end{pmatrix}, T_2 = \frac{1}{25}\begin{pmatrix} 1 & 1 & 2 \\ 1 & 2 & 4 \\ 2 & 4 & 8 \end{pmatrix}, T_3 = \begin{pmatrix} 1 & 2 & 1 \\ 2 & 4 & 2 \\ 1 & 2 & 1 \end{pmatrix}; \tag{7}$$

and
using $T_1$ as an example, two-dimensional inversion section data (i, j) is smoothed inside the neighborhood, and a specific algorithm may be expressed as:

$$data_s = \sum_{i,j=1}^{2} data(i, j) * T_1(i, j),$$

wherein
$data_s$ is the numerical value at the target position after smoothing.

* * * * *